STEREOPHONIC ELECTRODYNAMIC TRANSDUCER

Filed Jan. 30, 1961

2 Sheets-Sheet 1

INVENTORS
Hans-Joachim Klemp &
Horst Redlich

BY George H. Spencer
ATTORNEY

INVENTORS
Hans-Joachim Klemp &
Horst Redlich
BY Spencer & Kaye
ATTORNEYS

United States Patent Office 3,236,955

Patented Feb. 22, 1966

3,236,955

STEREOPHONIC ELECTRODYNAMIC TRANSDUCER

Hans-Joachim Klemp and Horst Redlich, Berlin-Steglitz, Germany, assignors to Telefunken Aktiengesellschaft, Berlin, Germany Filed Jan. 30, 1961, Ser. No. 85,711
Claims priority, application Germany, Feb. 2, 1960, T 17,816
9 Claims. (Cl. 179—100.41)

The present invention relates to transducers.

More particularly, the present invention relates to a transducer for producing, i.e., cutting or writing, a groove-shaped sound track in, or scanning the groove-shaped sound track of, a record carrier, in which sound track there are two preferably different signals. Such recordings are used mainly in the stereophonic art. The deflections of the cutting or writing stylus or of the playback stylus will then take place in two mutually perpendicular directions which lie in a deflection plane that is at right angles to the direction of the length of the groove, thereby avoiding cross talk from one signal channel to the other.

The present invention is based on a transducer having a coil carrier which is rigidly connected with the cutting or playback stylus and which is yieldably mounted so as to allow it to undergo translational and rotational deflections in the deflection plane. The coil carrier carries two similar coil means which are in mirror-image symmetry with each other relative to a plane of symmetry that passes through the cutting or playback stylus and that is at right angles to the deflection plane, and which coil means are traversed by the lines of flux of a magnetic field. Each of the coil means, taken by itself, is arranged non-symmetrically with respect to this plane of symmetry so that when such coil means are excited with a signal current from one of the two signal channels, there will, during recording or groove cutting, be a stylus deflection at a predetermined acute angle of preferably 45° with respect to the surface of the record carrier in which the groove is formed. Such a transducer is disclosed in British Patent No. 394, 325, page 17, lines 59 to 76, corresponding to United States Patent No. 2,093,540, dated September 21, 1937.

By means of such a transducer, so-called 45° writing, in which the directions of deflection of both signals form angles of 45° with the surface of the record carrier, can be produced or scanned directly, i.e., without mechanical deflection means or special electrical coupling means, such as are shown in the above-mentioned British Patent No. 394,325 (compare FIGURE 8 and FIGURE 3). However, by additionally interposing such a coupling circuit which forms the sum of and the difference between the two signals, the same transducer can be used to produce or scan so-called 90° writing.

In the transducer described in the afore-mentioned British patent, the midpoints of the two coils and the tips of the cutting stylus are located approximately at the corners of an equilateral triangle, through the center of which passes the axis about which the coil carrier may pivot. Additionally, the coil carrier is free to undergo translational movement in a direction normal to the surface of the record carrier, i.e., the coil carrier can move in a direction corresponding to the depth of the recording. Thus, the deflection of the tip of the stylus, at the desired angle and under the influence of a force acting on the coil, is dependent on the correct selection of many individual factors. Furthermore, the coil carrier has to undergo a movement which is the resultant of the proper amounts of a pivotal movement about the pivot axis and a translational movement. These components of the movement, as well as the position of the pivot axis, are determined by the type and strength of the elastic mounting means, the moments of inertia, and the mass distribution of the various movable parts as well as by the lever arms of the driving forces. Conversely, these factors, in the case of a groove scanner, determine the type of movement of each individual coil if the scanning stylus travels through the groove and moves at an angle of 45° relative to the surface of the groove or record carrier. Inasmuch as in that case, in 45° writing, a signal voltage should be induced in one coil only, the other coil should not move in its assigned direction of deflection, and any movement such coil does carry out should be limited to small pivotal movements and small translational movements in a direction normal to its assigned deflection direction.

It will be appreciated that a number of difficulties will be encountered if the principle disclosed in British Patent No. 394,325 is to be reduced to practice, particularly because a number of limiting conditions must be taken into consideration insofar as the selection of the lever arms for the two coils is concerned. In order to obtain good oscillating characteristics at high frequencies, the moment of inertia of the movable parts, including the coils, must be kept small. It is, therefore, necessary to make the coil carrier as compact as possible and to use correspondingly small lever arms. Under these circumstances, it is no longer a simple matter to adjust the rotational and translational components of the transducer drive in the manner necessary to produce the desired direction of deflection of the tip of the stylus. This is so because if the lever arms are too small, the rotational component will be too small as compared to the translational component.

It is, therefore, a primary object of the present invention to provide a transducer which overcomes the above disadvantages, and with that object in view, the present invention resides mainly in an electromechanical (or mechanicoelectrical) transducer adapted to carry a stylus and usable for writing a groove-shaped sound track in, or scanning the groove-shaped sound track of, a record carrier in which sound track two signals are written or scanned simultaneously such that deflections of a stylus carried by the transducer which correspond to the signals occur in mutually perpendicular directions which lie in a deflection plane that is at right angles to the tangent of the groove. The transducer incorporates a coil carrier which is rigidly connectible with the stylus and is yieldably mountable for translational and rotational deflection in the deflection plane. The coil carrier carries two similar coil means which are arranged in mirror-image symmetry with respect to a plane of symmetry that passes through the stylus and is at right angles to the deflection plane. The two coil means, when the carrier is mounted, are traversed by the lines of flux of a magnetic field, and each of the coil means, taken by itself, is non-symmetrical with respect to the plane of symmetry such that, during groove writing, excitation of the coil means by a signal from one of two signal channels produces a stylus deflection at a predetermined acute angle, preferably 45°, with respect to the surface of the record carrier. According to the present invention, each coil means is comprised of a main coil component and an auxiliary coil component, the main coil component being predominantly on one side of the plane of symmetry and the auxiliary coil component being predominantly on the opposite side of this plane of symmetry. Furthermore, the ratio of the number of turns of each auxiliary coil component to the number of turns of the corresponding main coil component, and the direction in which the coil components are interconnected, are so selected that, during groove writing, a signal coming from one of the two signal channels and fed to one of the coil means produces a deflection of the tip of the stylus at the afore-mentioned predetermined angle, and during groove scanning, such deflection, when produced by a mechanical force, produces a signal substantially exclusively in but one of the two signal channels.

The transducer will generally also include pick-up coils, as well as compensating coils.

Additional objects and advantages of the present invention will become apparent upon consideration of the following description when taken in conjunction with the accompanying drawings, in which:

FIGURE 1 is an elevational view, partly in section, of a transducer according to the present invention.

FIGURE 2 is an elevational view of the transducer illustrated in FIGURE 1 but seen in a direction displaced 90° from the direction in which FIGURE 1 is seen.

FIGURE 5 also shows the compensating coils.

Figures 1, 2:
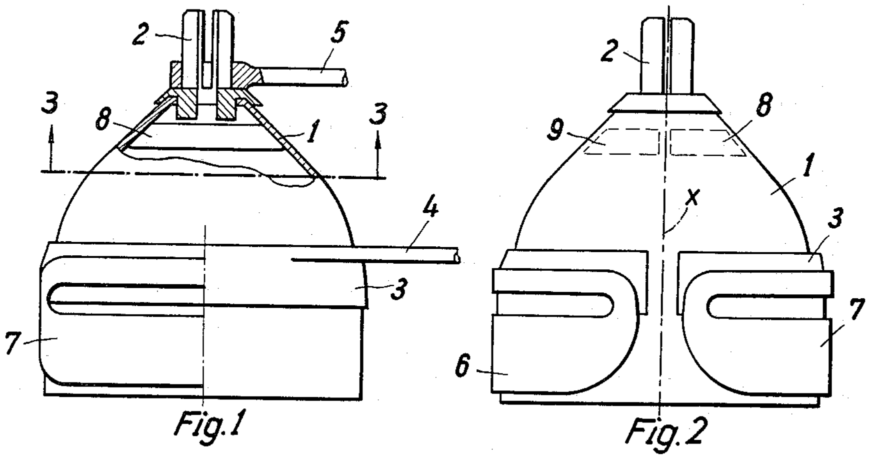
Figures 3, 4:
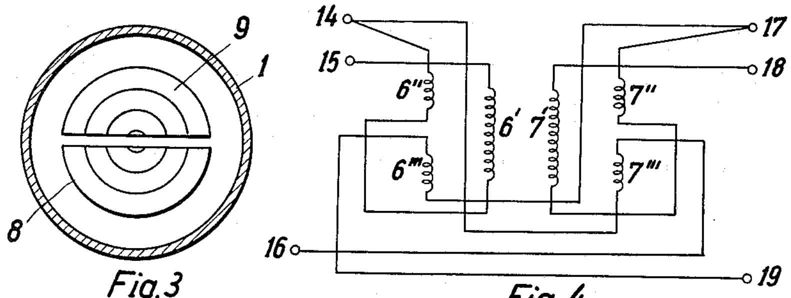
FIGURE 3 is a sectional view taken substantially along line 3—3 of FIGURE 1.
FIGURE 4 is a circuit diagram showing the electrical connections of the coils carried by the coil carrier.

Referring now to the drawings and to FIGURES 1 to 3 thereof in particular, the same show a transducer comprising a generally bell-shaped coil carrier 1 which is made of a material in which sound travels very fast. An example of such a material is a ceramic sintered substance.

The shape of the carrier 1 is not limited to that shown in the drawings; instead, the carrier may be hemispherical, or conical, or it may be one half of an ellipsoid of rotation. For the sake of simplicity, the term "hemispherical," as used throughout the instant specification and claims, will be deemed to include any such general shape, the point at which the stylus socket 2 is arranged being considered the pole of the hemisphere and the flat plane bounding the lower part of the carrier being considered a central plane, i.e., a plane passing through the center of the sphere of which the hemisphere is one half.

The carrier 1 is mounted by a clamp-type yoke 3 the two arms of which encompass the carrier in a region intermediate the pole and the central plane of the hemisphere. The yoke 3 has connected to it a spring 4, the parts 3, 4, thus constituting one of two mounting elements for the carrier 1. The other mounting element is constituted by a rod-shaped spring 5 which is connected to the stylus socket 2. The opposite ends of the springs 4 and 5 are fixedly attached to the wall of the transducer (not shown). These mounting elements, which, per se, are well known in the art and do not form any part of the present invention, yieldably mount the carrier 1 in such a manner that the carrier can execute translational movement in the direction of its own axis as well as rotational movement about a pivot axis which lies between the points at which the springs 4, 5, are attached to the carrier 1, more particularly, between the stylus and the plane passing through the median coil turn.

As is best shown in FIGURE 2, the carrier 1 carries near its central plane two driving coil units 6 and 7 each of which has an arcuate strip-shaped configuration and encompasses substantially half of the carrier, the unit 6 comprising coils 6′, 6″, and 6‴, and the unit 7 comprising coils 7′, 7″, and 7‴, as will be described below.

Figure 5:
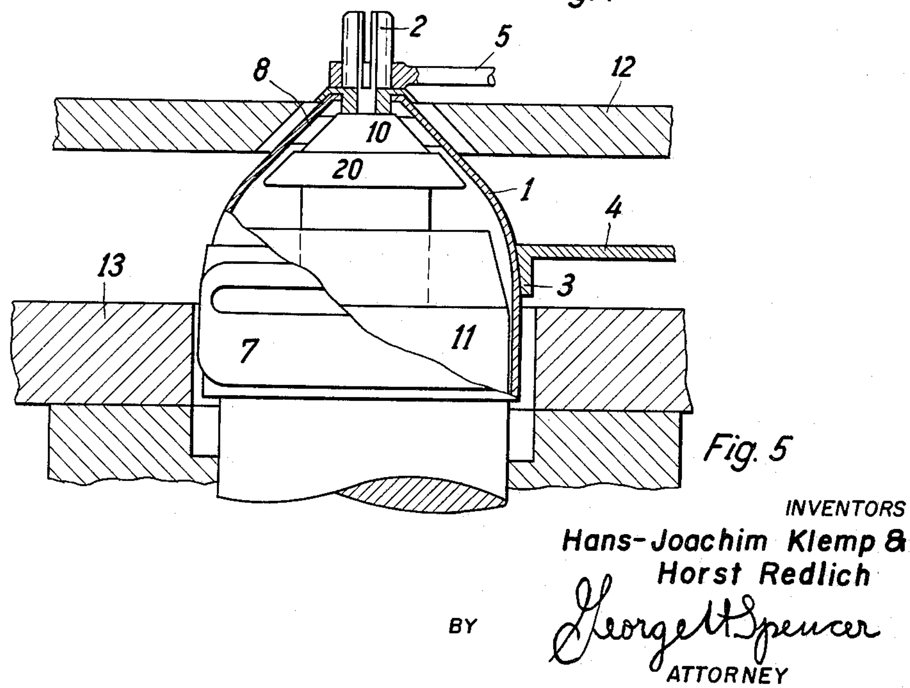
FIGURE 5 is an elevational view, partly in section, of a transducer according to the present invention, FIGURE 5 showing a mounting for the transducer as well as the magnetic systems associated with the coil means and the pick-up coils.

Each unit is divided into active and inactive turn portions, the former being arranged, as shown in FIGURE 5, within the annular air gap formed between an outer ring

13 and a core 11 located interiorly of the carrier. The ring 13 and core 11 form part of the magnetic system associated with the transducer. Thus, the active turn portions, which lie in planes normal to the particular diameter of the hemisphere which is in alignment with the stylus held in the socket 2, are traversed by the lines of magnetic flux extending between the ring 13 and core 11, whereas the inactive turn portions are located substantially outside of the influence of this magnetic field. Instead of being arranged laterally of the active turn portions, as shown in the drawings, the inactive turn portions may pass through a substantially diametric slot in the core 11.

The coil carrier 1 also carries pick-up coil units 8 and 9 which, as shown in FIGURES 2 and 5, are arranged near the pole of the hemisphere and are located within an annular air gap bounded by conical surfaces of the outer ring 12 and an inner core 10, the ring 12 and core 10 likewise being part of the magnetic system of the transducer. The angle which these conical surfaces form with the axis of the air gap is at least approximately equal to 45°. When the transducer is used as a recording device, the pick-up coils serve as negative feedback coils for picking up negative feedback voltages.

FIGURE 4 is a circuit diagram showing how the individual coils of the two coil means for the two signal channels are distributed between the two coil units 6, 7. The terminals 14, 15, 16, pertain to a channel A and terminals 17, 18, 19, to a channel B. The coil means pertaining to channel A comprises a main coil component which includes the coils 6′ and 6″, and an auxiliary coil component which includes the coil 7‴; the coil means pertaining to channel B comprises a main coil component which includes the coils 7′ and 7″, and an auxiliary coil component which includes the coil 6‴. As is shown in FIGURE 4, the two coils 6′ and 6″ of the main coil component of channel A are serially connected between the terminals 14 and 15, whereas coils 7′ and 7″ of the main coil component of channel B are serially connected between terminals 17 and 18. The main coil components are divided into separate coils solely for structural purposes in order to allow these coils to be accommodated within the air gap together with the auxiliary coil of the coil means pertaining to the other channel. The auxiliary coil component of channel A, namely, coil 7‴, is connected to the terminals 14 and 16; similarly, coil 6‴ is connected to terminals 17 and 19.

Figure 6:
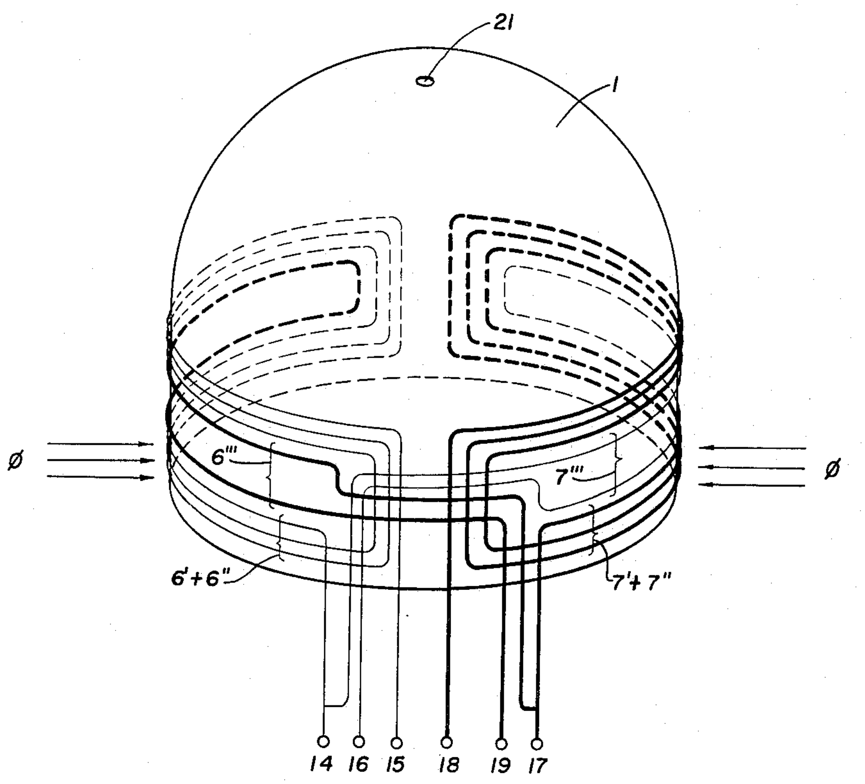
FIGURE 6 is a diagrammatic perspective view showing the physical arrangement of the coils on the coil carrier.

As shown in FIGURE 6, the coil unit 6 is so arranged that coil 6′ is on the outside of the carrier and is superposed upon, and at least partially overlaps, the coils 6″ and 6‴. The coil unit 7 is similarly arranged. In FIGURE 6, the pole of the carrier is shown at 21, and the magnetic flux by the arrows $\phi$.

The pick-up or negative feedback coil units 8 and 9 comprise individual main and auxiliary coil components. The physical and electrical arrangements are similar to those described above in connection with the driving coils and are, therefore, not shown in detail. It will suffice to point out that each main pick-up coil component of channel A will overlap an auxiliary pick-up coil component of channel B.

FIGURE 5 also shows the position of one of two compensating coil units 20 which likewise incorporate main and auxiliary coil components. Thus, each unit will include the main coil component for one channel and the auxiliary coil component of the other channel. The compensating coils, which compensate voltages induced in the negative feedback coils by the driving coil means of the transducer, are fixedly mounted on the core projecting into the coil carrier and thus do not partake of any movement of the carrier 1.

It will be appreciated that by distributing the main and auxiliary coil components of the same channel on opposite sides of the plane of symmetry $x$, FIGURE 2, it is possible, in a recording device which incorporates a compact coil carrier and in which the correspondingly short lever arms of the driving force produced by the coils result in rotational components that are too small as compared with the translational components, to increase such rotational components by interconnecting the main and auxiliary coil components in such direction that the forces acting in the coil components produce torques in the same rotational direction, these forces being opposed to each other along their parallel lines of action so that the resultant force which is effective for the translational components of the movement is equal to the difference of the individual forces.

In the case of a relatively wide coil carrier having a large lever arm and in which there is a preponderance of the rotational components, it may be advantageous to connect the coils in such a manner as to produce opposed torques, if the spatial direction of the applied forces is the same. By selecting the ratio of the number of turns of the auxiliary coil component to the number of turns of the corresponding main coil component, the strength of the resulting torque can always be adjusted so as to have the desired relation to the resultant of the forces. In practice, the number of turns of the auxiliary coil component will generally be substantially less than the number of turns of the corresponding main coil component. For example, the ratio of the number of turns of the auxiliary coil component to the number of turns of the main coil component may be of the order of approximately 13 to 47.

If the transducer is to be used as a scanning device, the effective direction is reversed so that corresponding conditions will apply for the interconnection of the coil components and the number of turns thereof.

It should be noted that German Patent No. 1,031,536 discloses a mechanicoelectrical transducer for the same purpose, in which two coils or coil units are carried by a movable coil carrier. However, in the transducer shown in that patent, the turns of the first winding extend in the same direction throughout the entire circumference of the coil carrier, and serve only to convert signals to motion components extending in the direction of the axis of the coil winding, or to convert such motion component into signals. Half of the turns of the second winding extend in the same direction throughout a part of this circumference and the remaining half of the turns extends in the opposite winding direction throughout another part of this circumference, and serves only to convert signals into motion components normal to the axis of the first winding, or to convert such motion components into signals. Thus, the first winding serves solely to produce or convert the translational components of the movement and the second coil serves solely to produce or convert the rotational components. Such a transducer is suitable for producing or scanning so-called 90° recordings directly, in which one of the signals is in the form of a hill-and-dale track and the other signal in the form of a lateral track. For producing or scanning the 45° recording, which has recently become the preferred type, a coupling circuit must be used which produces vectorial sum and difference values from the signal components. A transducer according to the present invention, however, can be so adapted without using any special coupling circuit, but requires merely the two coil means which are connected to the two signal channels, respectively.

It will also be appreciated that a transducer according to the present invention may readily be used in a recording device as well as in a scanning device for stereophonic signals. If the transducer is to be used in a recording device, the driving coils are the coil means arranged near the central plane; if the transducer is to be used in a scanning device, the pick-up coils are the coils located near the pole at which the stylus socket 2 is arranged and mounted on a part of the carrier 1 which, together with the tip of the scanning stylus, undergoes mainly translational movement in the deflection plane.

As described above, if the transducer is to be used in a recording device, negative feedback can be obtained by using the pick-up coils to serve as feedback coils. In such recording devices, there exists the problem of avoiding a direct inductive voltage transmission from the driving coils to the negative feed-back coils, and this is prevented by providing the above-described compensating coils.

It will be understood that the above description of the present invention is susceptible to various modifications, changes and adaptations, and the same are intended to be comprehended within the meaning and range of equivalents of the appended claims.

We claim:

1. A transducer, adapted to carry a stylus, for writing a groove-shaped sound track in, or scanning the groove-shaped sound track of, a record carrier in which sound track two signals are written or scanned simultaneously such that deflections of a stylus carried by the transducer which correspond to the signals occur in mutually perpendicular directions which lie in a deflection plane that is at right angles to the direction of the length of the groove, said transducer incorporating a coil carrier which is rigidly connectible with the stylus and yieldably mountable for translational and rotational deflections in said deflection plane, said coil carrier carrying two similar coil means, said coil means being arranged in mirror-image symmetry with respect to a plane of symmetry that contains the axis of the stylus and is at right angles to said deflection plane, said two coil means, when said carrier is mounted, being traversed by the lines of flux of a magnetic field emanating from pole pieces with which the transducer is associated, each of said coil means, taken by itself, being arranged non-symmetrically with respect to said plane of symmetry such that, during groove writing, excitation of said coil means by a signal from one of two signal channels produces a stylus deflection at a predetermined acute angle with respect to the surface of the record carrier, and, during groove scanning, such deflection, when produced by a mechanical force, produces a signal substantially exclusively in but one of the two signal channels, each of said two coil means being comprised of a main coil component and an auxiliary coil component, said main coil component being predominantly on one side of said plane of symmetry and said auxiliary coil component being predominantly on the opposite side of said plane of symmetry, the number of turns of each auxiliary coil component being substantially less than the number of turns of the corresponding main coil component.

2. A transducer as defined in claim 1 wherein said predetermined angle is 45°.

3. A transducer as defined in claim 1 wherein said coil components are so arranged that the main coil component of one of said coil means and the auxiliary coil of the other of said coil means are superposed upon and at least partially overlap each other.

4. In a recording device, the combination which comprises: a transducer as defined in claim 1, said coil carrier being approximately hemispherical and said coil means being arranged near the central plane of the hemisphere; and means for so mounting said carrier that the same may rotate about a pivot axis which is between a stylus arranged at the pole of the hemisphere and the plane passing through the median coil turn.

5. A transducer as defined in claim 1 wherein said coil carrier is approximately hemispherical, and wherein each of said coil components has active turn portions which are traversed by said lines of magnetic flux and which lie in planes normal to a diameter of said hemisphere which is in alignment with the stylus.

6. A transducer as defined in claim 5 wherein said coil means are arranged in two units each having an arcuate strip-shaped configuration and encompassing substantially half of said coil carrier.

7. A transducer as defined in claim 6 wherein each unit includes inactive turn portions of said coil components.

8. A transducer as defined in claim 7 wherein said inactive turn portions of said coil components are arranged laterally of said active turn portions and are located substantially outside of the influence of the magnetic field by whose lines of flux said active turn portions are traversed.

9. A transducer as defined in claim 7 wherein there is arranged within said coil carrier a core forming part of a magnetic system by whose lines of flux said active turn portions are traversed, and wherein said inactive turn portions pass through a substantially diametric slot in said core.

References Cited by the Examiner

UNITED STATES PATENTS

| | | | |
|---|---|---|---|
| 2,093,540 | 9/1937 | Blumlein | 179—100.41 |
| 2,161,489 | 6/1939 | Vieth | 179—10.41 |
| 2,962,561 | 11/1960 | Redlich | 179—100.4 |
| 3,014,992 | 12/1961 | Redlich | 179—100.41 |
| 3,067,295 | 12/1962 | Stanton | 179—100.41 |

FOREIGN PATENTS

| | | |
|---|---|---|
| 1,159,970 | 7/1958 | France. |

IRVING L. SRAGOW, *Primary Examiner.*

JOHN P. WILDMAN, BERNARD KONICK, *Examiners.*